(12) United States Patent
Wang et al.

(10) Patent No.: US 6,678,459 B1
(45) Date of Patent: Jan. 13, 2004

(54) METHOD FOR BONDING TWO OPTICAL PARTS AND APPARATUS THEREOF

(75) Inventors: Li Wang, San Jose, CA (US); Bright An, Mountain View, CA (US); Yi-ping Loh, San Jose, CA (US); Timothy Yuen-Lian Wang, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 138 days.

(21) Appl. No.: 10/046,445

(22) Filed: Oct. 29, 2001

(51) Int. Cl.[7] .................................................. G02B 6/26
(52) U.S. Cl. ........................................ 385/147; 385/39
(58) Field of Search ..................... 385/147, 39, 41–43, 385/112, 114, 115, 46, 48, 51, 126, 127, 23, 22

(56) References Cited

U.S. PATENT DOCUMENTS 5,459,804 A * 10/1995 Stowe .......................... 385/42

* cited by examiner

*Primary Examiner*—Frank G. Font
*Assistant Examiner*—Michael P. Mooney
(74) *Attorney, Agent, or Firm*—Joe Zheng; C. P. Chang; Pacific Law Group, LLP

(57) ABSTRACT

A method for bonding two or more optical parts and an optical apparatus of using the method are disclosed. According to one embodiment, two optical fiber segments are used as a spacer between two optical parts. The optical fiber segments may be cut off from a commonly used optical fiber according to the size of the parts. In general, the diameter of the optical fiber segments is small, the capillary effect for commonly used adhesives can be eliminated when the two optical parts are bonded with the optical fiber segments in between.

10 Claims, 3 Drawing Sheets

METHOD FOR BONDING TWO OPTICAL PARTS AND APPARATUS THEREOF

BACKGROUND OF THE INVENTION

1. Technical Field

The present invention relates to a method for bonding two or more optical parts and an optical apparatus using the method.

2. Description of the Prior Art

In designing, processing or manufacturing fiber optical components, it is often necessary to bond two or more optical parts together. Traditionally, in the process of bonding two optical parts with flat surfaces, some kinds of bonding adhesives such as epoxies and acrylics are often used. However, most of the adhesives that have acceptable performances for the fiber optical device applications either have a very low viscosity to begin with, or their viscosity becomes lower in the curing process (e.g. UV curing or thermal curing). As a result, some adhesive substances can go into the interface gap between the two flat surfaces of the optical parts being bonded due to the well-known capillary effect if there are no isolation frames, or spacers in between the two flat surfaces. To eliminate the capillary effect, a frame (e.g. metal or plastic material) is often used to maintain a minimum distance between the two flat surfaces, as shown in FIG. 1A. FIG. 1B shows that two optical parts are bonded together with a frame in between as a spacer. But this traditional solution has some drawbacks. First of all, since most of fiber optical devices are very small, most likely, the frame must be machined with very high precision, therefore, it can be costly. In addition, since the frame must be somehow fixed to a substrate to complete the whole component, it will add difficulty and complexity to the overall mechanical characteristics, which in turn will reduce the stability and reliability of this device, especially over long time and in a harsh temperature and mechanical environment.

There is thus a great need for an economic and reliable solution to bonding two or more optical parts together.

SUMMARY OF THE INVENTION

The present invention, generally speaking, provides an economic and reliable solution to bonding two or more parts with, preferably, flat surfaces by using optical fibers as a spacer. Since optical fibers are readily available in many situations, the present invention offers many unanticipated advantages and/or benefits. First of all, the present invention eliminates the need to customize particular spacers when two parts to be bonded show some irregularities, optical fibers can be cut in any length to accommodate the special situation. Secondly, the separation space created by the optical fiber (the diameter of a common single mode fiber without buffer is 0.125 mm) is just right to eliminate the capillary effect for most commonly used adhesives. Another advantage and benefit of the present invention is that the fiber spacer solution is much economic compared to the frame based solutions.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention pertains to a method for bonding two or more optical parts together and optical apparatus using the method. According to one aspect of the present invention, at least two pieces of optical fiber are used as a spacer between two optical parts that been to be bonded together. Since optical fibers are readily available in many situations, the present invention offers many unanticipated advantages and/or benefits. First of all, the present invention eliminates the need to customize particular spacers when two parts to be bonded show some irregularities, optical fibers can be cut in any length to accommodate the special situation. Secondly, the separation space created by the optical fiber (the diameter of a common single mode fiber without buffer is 0.125 mm) is just right to eliminate the capillary effect for most commonly used adhesives. Another advantage and benefit of the present invention is that the fiber spacer solution is much economic compared to the frame based solutions Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
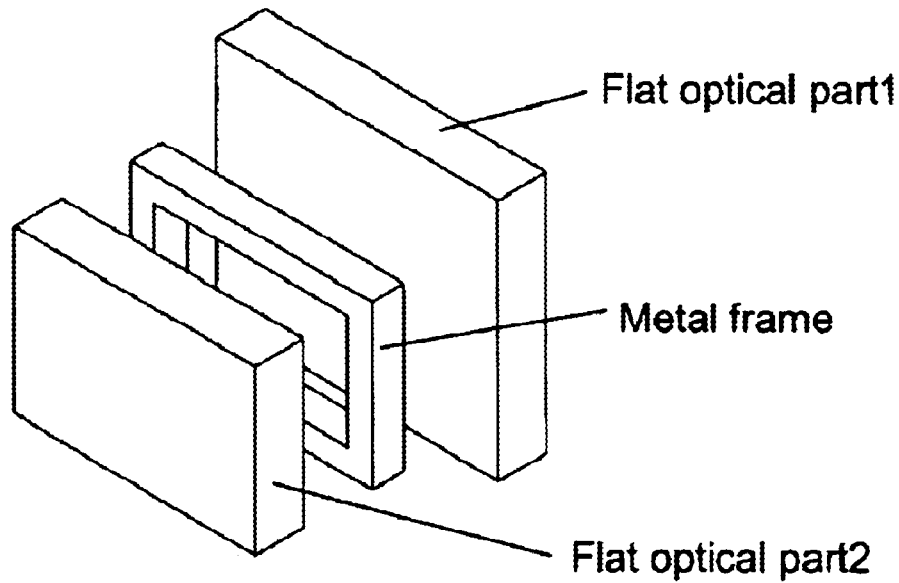
FIG. 1A illustrates that a metal frame is being used as a spacer between two optical parts with flat surfaces.
Figure 1B:
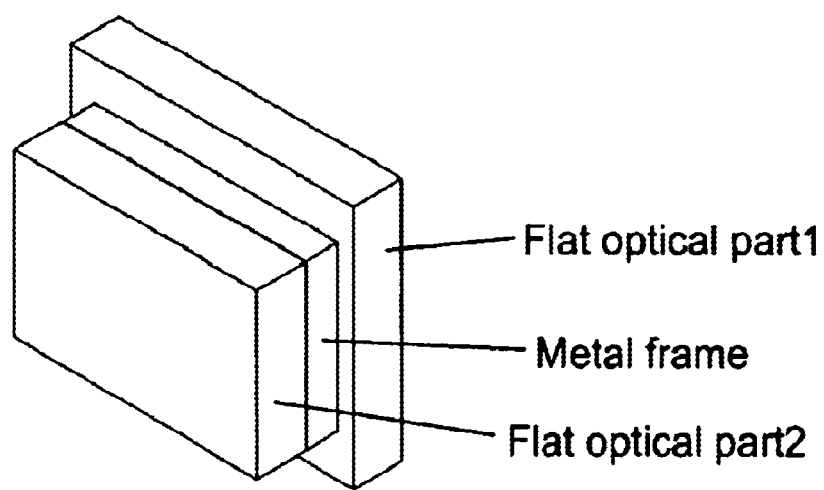
FIG. 1B shows a perspective view of two optical parts being bonded via a metal frame.
Figure 2A:
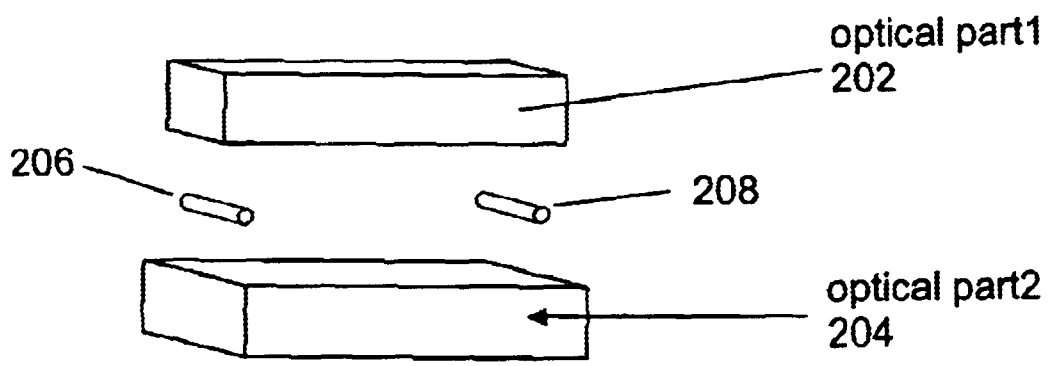
FIG. 2A shows that two pieces of optical fibers are being used as a spacer.

Referring now to the drawings, in which like numerals refer to like parts throughout the several views. FIG. 2A shows that two optical parts 202 and 204 to be bonded together. The optical parts 202 and 204 have preferably inner faces being flat. According to one embodiment, two fiber segments 206 and 208 are used to as a spacer between the optical parts 202 and 204. Generally, the two fiber segments 206 and 208 may be readily cut from a regular optical fiber that is commonly available. Although the lengths of the two fiber segments 206 and 208 are substantially the same, it is not a requirement to practice the present invention. Depending on the shapes of the optical parts 202 and 204 and applications of an optical apparatus using the method, the two fiber segments 206 and 208 may be bended to a shape consistent with that of the optical part 202 or 204 for better integration. In any case, the placement of the two fiber segments 206 and 208 between the optical parts 202 and 204 shall ensure that no optical path is blocked. In other words, a light beam going through the optical parts 202 and 204 should not be blocked by either of the two fiber segments 206 and 208.

Figure 2B:
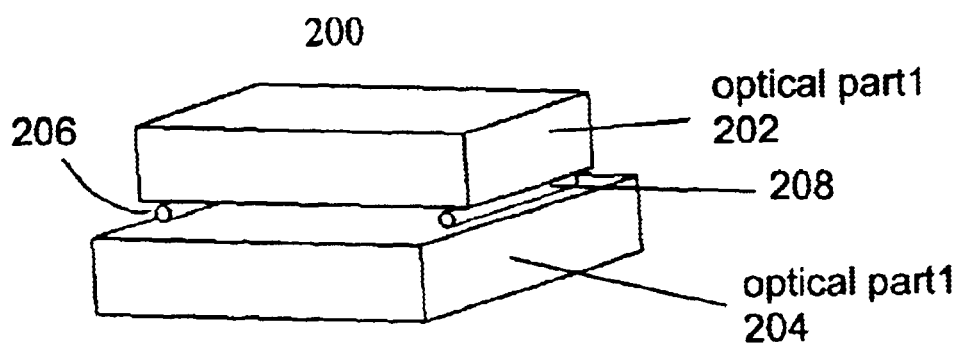
FIG. 2B shows that a perspective view of two optical parts being bonded via two pieces of optical fiber.

To maintain a required space between the two optical parts 202 and 204, the two fiber segments 206 and 208 are applied to by an adhesive substance (e.g. an epoxy) and positioned between the two optical parts 202 and 204. As a result, an integrated optical part 200 is formed as shown in FIG. 2B.

According to one embodiment, each of the two optical parts 202 and 204 has at least one flat surface. When the two fiber segments 206 and 208 are positioned between two flat surfaces of the two optical parts 202 and 204, the integration thereof with the adhesive substance can be stronger. However, having the flat surface is not a requirement to practice the present invention. In a rare situation, the two fiber segments 206 and 208 can be formed to accommodate possible uneven surfaces of the two optical parts 202 and 204.

Figure 3:
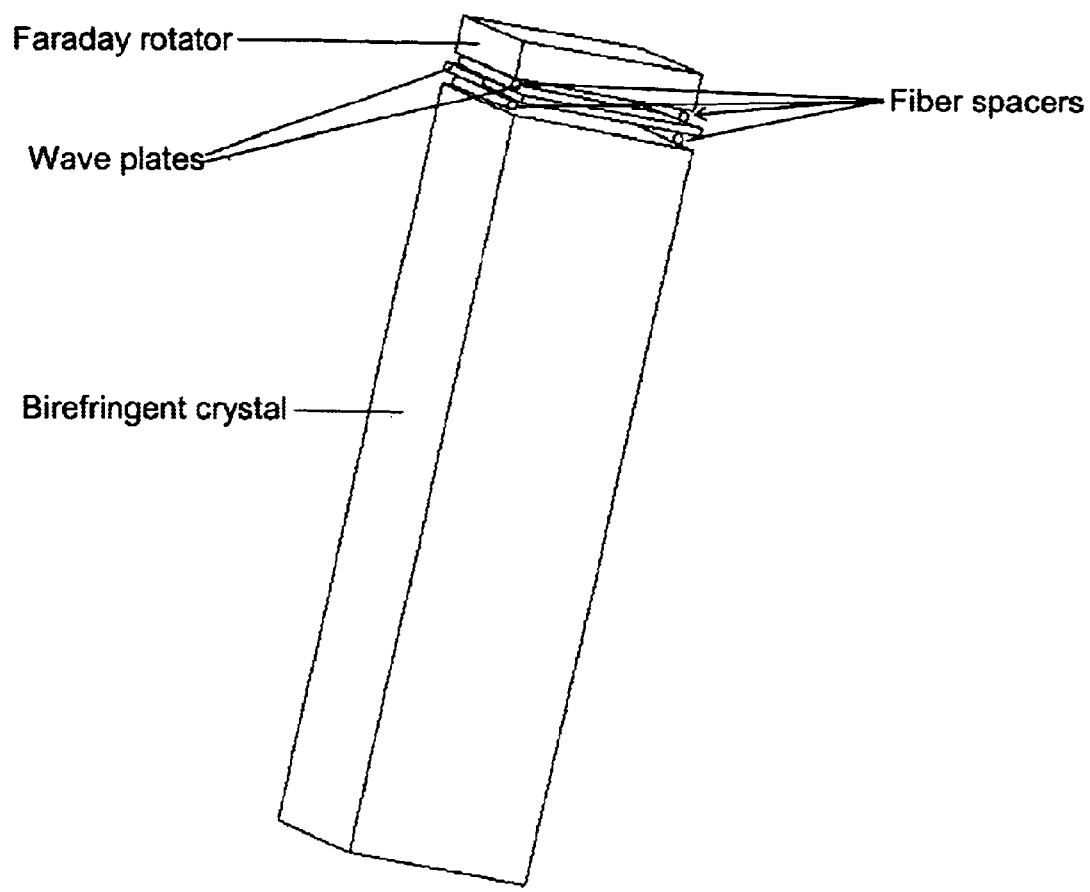
FIG. 3 illustrates an assembly of a Faraday rotator, wave plates and birefringent crystal using fiber spacers.

There are many possible ways to arrange two or more fiber segments to realize the fiber spacer contemplated in the present invention. As indicated in FIG. 2A or 2B, two optical parts can be bonded by the means of a fiber spacer with an adhesive substance. The present invention can be certainly applied in bonding three or more optical parts. One example which is used in fiber optical circulators is shown in FIG. 3 in which two waveplates, one Faraday rotator and one birefringent crystal are all bonded together using two layers of fiber spacers with epoxy.

Generally, an optical fiber without buffer can be much thinner than the thickness of metal frames traditionally used as the spacer, therefore, the optical openings of the parts based on a fiber spacer is larger than the metal frame based solutions for the same physical sizes of the parts. In addition, any optical fiber either with buffer or without buffer can be used in this invention. The fibers can be cut and placed appropriately to accommodate any specific situations. The separation created by the optical fiber (e.g. the diameter of a common single mode fiber without buffer is 0.125 mm) is just right to eliminate the capillary effect for most commonly used adhesive substance.

The present invention has been -described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for bonding two optical parts, the method comprising:

determining a first length and a second length of two optical fiber segments to be used as a spacer between the two optical parts;

obtaining the two optical fiber segments of the first and second lengths; and placing the two optical fiber segments between the two optical parts to be bonded in such a way that no optical path through the two optical parts will be blocked, wherein each of the two optical parts has at least one side having a flat surface, the flat surfaces of the two optical parts face to each other and the spacer is positioned therebetween.

2. The method of claim 1 further comprising applying an adhesive substance to permanently position the two optical fiber segments between the two optical parts and at the same time bond the two optical parts together.

3. The method of claim 1, wherein the obtaining of the two optical fiber segments of the specified lengths comprises cutting the two optical fiber segments from an optical fiber according to the first and second lengths.

4. The method of claim 3, wherein the obtaining of the two optical fiber segments of the specified lengths further comprises bending the two optical fiber segments to a shape consistent with that of the two optical parts.

5. The method of claim 3, wherein the first and second lengths are identical.

6. The method of claim 2, wherein the placing of the two optical fiber segments comprises keeping the two optical fiber segments in parallel.

7. The method of claim 2, wherein the two optical fiber segments have a diameter that is just right to eliminate a capillary effect from the adhesive substance.

8. An optical apparatus comprising:

two parts, each of the two parts having at least one flat surface, a spacer positioned between the two parts in such a way that no optical path through the two parts will be blocked, and the spacer can be secured on the flat surface of each of the two parts, the spacer including two optical fiber segments of a first length and a second length; and wherein an adhesive substance is applied to the two optical fiber segments that bond the two parts together.

9. The optical apparatus of claim 8, wherein both of the two optical fiber segments are cut from an optical fiber according to the first length and the second length.

10. The optical apparatus of claim 8, wherein both of the two optical fiber segments are bend to form a shape suitable to that of the two parts.

* * * * *